United States Patent [19]

Hellmuth et al.

[11] Patent Number: 5,469,261
[45] Date of Patent: Nov. 21, 1995

[54] MEASUREMENT OF LENS CHARACTERISTICS

[75] Inventors: Thomas Hellmuth, Danville; Charles E. Campbell, Berkeley; Jay Wei, Fremont, all of Calif.

[73] Assignee: Carl Zeiss, Inc., Thornwood, N.Y.

[21] Appl. No.: 301,260

[22] Filed: Sep. 6, 1994

Related U.S. Application Data

[63] Continuation-in-part of Ser. No. 223,434, Apr. 5, 1994.

[51] Int. Cl.$^6$ ............................................. G01B 9/02
[52] U.S. Cl. ................................... 356/361; 356/360
[58] Field of Search ................................ 356/361, 124, 356/360, 359, 128

[56] References Cited

U.S. PATENT DOCUMENTS

| | | | |
|---|---|---|---|
| 3,539,262 | 11/1970 | Pryor | 356/361 |
| 4,072,422 | 2/1978 | Tanaka et al. | 356/361 |
| 4,180,325 | 12/1979 | Humphrey | 356/127 |
| 4,685,803 | 8/1987 | Sommargren | 356/361 |
| 4,711,576 | 12/1987 | Ban | 356/359 |
| 4,733,967 | 3/1988 | Sommargren | 356/361 |
| 4,872,755 | 10/1989 | Küchel | 356/360 |
| 5,151,752 | 9/1992 | Oono et al. | 356/361 |

FOREIGN PATENT DOCUMENTS

| | | | |
|---|---|---|---|
| 0277496 | 8/1988 | European Pat. Off. | 356/361 |
| 3-225259 | 10/1991 | Japan | 356/361 |
| 5-113398 | 5/1993 | Japan | 356/361 |
| 1173177 | 8/1985 | U.S.S.R. | 356/361 |

OTHER PUBLICATIONS

The Dioptrometer: An Apparatus For Measuring The Power Of Commercial Lenses, H. F. Kurtz, *J. Opt. Soc. Am. and Rev. Sci. Instrum.*, vol. 7, Nos. 1 to 12, 1923, pp. 103–125.

Eugene Hecht and Alfred Zajac *Optics,* Published by Addison–Wesley Publishing Company, Inc Feb. 1979, pp. 62–63 and 75–84.

Optical coherence–domain reflectometry: a new optical evaluation technique by R. C. Youngquist, S. Carr, and D. E. N. Davies, *Optics Letters,* vol. 12, No. 3, Mar. 1987, pp. 158–160.

Optical Coherence Tomography by Huang et al., published in *Science,* 254, Nov. 22, 1991, pp. 1178–1181.

*Primary Examiner*—Samuel A. Turner
*Attorney, Agent, or Firm*—Michael B. Einschlag

[57] ABSTRACT

Method and apparatus for measuring the following lens characteristics: (a) curvature of the front and back surfaces of the lens; (b) physical thickness; and (c) index of refraction of the lens to determine the front vertex power, back vertex power; and the lens material. In particular, an embodiment of one aspect of the present invention for measuring the index of refraction of the glass includes: (a) a source of a substantially spatially coherent beam of radiation and having a short temporal coherence length; (b) a beamsplitter to provide a sample beam and a reference beam in response to the beam; (c) a translatable retroreflector which reflects the reference beam; (d) a holder to hold the material in the path of the sample beam, the holder including a retroreflector which reflects the sample beam back through the material and a caliper apparatus to measure the thickness of the material where the sample beam passes through; (e) a detector which detects the reflected reference beam and the reflected sample beam to produce a detector output signal; and (f) an analyzer which determines a position of the translatable retroreflector in response to the detector output signal and which determines the index of refraction of the material in response to the position of the translatable reflector means and the thickness of the material.

28 Claims, 4 Drawing Sheets

1

MEASUREMENT OF LENS CHARACTERISTICS

This is a continuation-in-part of a patent application having Ser. No. 08/223,434 which was filed on Apr. 5, 1994.

TECHNICAL FIELD OF THE INVENTION

The present invention pertains to method and apparatus for measuring lens characteristics such as, for example, the index of refraction.

BACKGROUND OF THE INVENTION

Various methods in the prior art are utilized to measure the index of refraction of glass. One method entails utilizing an Abbe refractometer to measure the critical angle of total reflection. In accordance with this method, the index of refraction is derived from the measured value of the critical angle. This method is illustrated in a book entitled "Optics" by Eugene Hecht and Alfred Zajac, published by Addison-Wesley Publishing Company, Inc. February, 1979 (Copyright 1974), pp. 81–84.

Another method utilized to measure the index of refraction of glass entails measuring the reflectivity of glass, which reflectivity depends on the index of refraction. The relation between index of refraction and reflectivity is described, for example, by the Fresnel formula shown on p. 75 of the above-identified reference.

Yet another method utilized to measure the index of refraction of glass entails measuring the deflection angle of a light beam passing through a sample block of glass. This method is illustrated on pp. 62–63 of the above-identified reference.

All of the above methods suffer from drawbacks. For example, all of the above methods require the surface geometry of the glass whose index of refraction is to be measured to be known. For example, the radii of curvature of the surfaces must be measured to an accuracy of about 0.1% to obtain a measurement of index of refraction of comparable accuracy. In addition, the first two methods are measurements of reflection. This is a drawback when measuring the index of refraction of spectacles since spectacles are often antireflection coated.

In light of the above, there is a need for a method and apparatus for measuring the index of refraction of glass such as the glass of spectacle lenses without measuring the surface geometry of the glass.

In addition to the above, currently available lensmeters are limited since they only measure the effective power of a lens and they do not measure the curvature of the front and back surfaces, the thickness of the lens, or the index of refraction of the lens. For example, see: (a) an article entitled "The Dioptrometer: An Apparatus For Measuring The Power Of Commercial Lenses" by H. F. Kurtz, J. Opt. Soc. Am. and Rev. Sci. Instrum., Vol. 7, Nos. 1 to 12, 1923, pp. 103–125 and (b) U.S. Pat. No. 4,180,325, entitled "Lens Meter With Automated Readout," issued Dec. 25, 1979, W. E. Humphrey. As a result of this limitation, lens characteristics such as, for example, front vertex power, back vertex power, and the index of refraction of the lens (which determines the lens material) cannot be determined. This is a disadvantage in that it is often desirable to have these lens characteristics.

In light of the above, there is a need for a method and apparatus for measuring the following lens characteristics: (a) curvature of the front and back surfaces of the lens; (b) physical thickness; and (c) index of refraction of the lens to determine the front vertex power, back vertex power; and the lens material.

SUMMARY OF THE INVENTION

Embodiments of a first aspect of the present invention advantageously satisfy the above-identified need in the art and provide a method and apparatus for measuring the index of refraction of glass such as the glass of spectacle lenses without measuring the surface geometry of the glass.

In particular, a first embodiment of the first aspect of the present invention is apparatus for measuring the index of refraction of a material which comprises: (a) a source of a substantially spatially coherent beam of radiation and having a short temporal coherence length; (b) means, in response to the beam, for providing a sample beam and a reference beam; (c) translatable reflecting means, disposed to reflect the reference beam; (d) holding means for holding the material in the path of the sample beam, said holding means comprising reflecting means for reflecting the sample beam back through the material and means for determining the thickness of the material where the sample beam passes through; (d) detector means, disposed to detect the reflected reference beam and the reflected sample beam, for producing a detector output signal in response thereto; and (f) analysis means, in response to the detector output signal, for determining a position of the translatable reflecting means and, in response to the position of the translatable reflecting means and the thickness of the material, for determining the index of refraction of the material.

In a specific instance of the first embodiment of the first aspect of the present invention, the source is an light emitting diode whose output is collimated and focused through a pinhole; the means for providing a sample and a reference beam is a beamsplitter; the translatable reflecting means is a retroreflector mounted on a stepper motor; the holder for the material is a caliper which holds the material at a predetermined distance from the beamsplitter and a retroreflector; and the detector means comprises a detector whose output is bandpass filtered, root means square filtered, and applied to a trigger.

In particular, a second embodiment of the first aspect of the present invention is apparatus for measuring the index of refraction of a material which comprises: (a) a source of a substantially spatially coherent beam of radiation and having a short temporal coherence length; (b) means, in response to the beam, for providing a sample beam and a first and a second reference beam; (c) translatable reflecting means, disposed to reflect the first reference beam; (d) holding means for holding the material in the path of the sample beam, said holding means comprising reflecting means for reflecting the sample beam back through the material and means for reflecting the second reference beam; (e) detector means, disposed to detect the reflected first reference beam, the reflected second reference beam, and the reflected sample beam, for producing a detector output signal in response thereto; and (f) analysis means, in response to the detector output signal, for determining a first and a second position of the translatable reflecting means and means, in response to the first and second positions of the translatable reflecting means, for determining the index of refraction of the material.

In a specific instance of the second embodiment of the first aspect of the present invention, the source is an light emitting diode whose output is collimated and focused through a pinhole; the means for providing a sample and a first and second reference beam is a first and a second beamsplitter; the translatable reflecting means is a retroreflector mounted on a stepper motor; the holder for the material is a caliper which holds the material and a first and a second retroreflector; and the detector means comprises a detector whose output is bandpass filtered, root means square filtered, and applied to a trigger.

Embodiments of a second aspect of the present invention advantageously satisfy the above-identified need in the art and provide a method and apparatus for measuring the following lens characteristics: (a) curvature of the front and back surfaces of the lens; (b) physical thickness; and (c) index of refraction of the lens to determine the front vertex power, back vertex power; and the lens material. In particular, an embodiment of the second aspect of the present invention is a method for measuring lens characteristics which comprises the steps of: (a) determining the index of refraction of the lens by performing the following steps: (i) forming a substantially spatially coherent beam of radiation having a short temporal coherence length; (ii) splitting the beam into a sample beam and a reference beam; (iii) reflecting the reference beam from a translatable reflector; (iv) holding the lens in the path of the sample beam and reflecting the sample beam back through the lens; (v) determining the thickness of the lens where the sample beam passes through the lens; (vi) detecting the reflected reference beam and the reflected sample beam and producing a detector output signal in response thereto; (vii) determining a position of the translatable reflector in response to the detector output signal; and (viii) determining the index of refraction of the lens in response to the position of the translatable reflector and the thickness of the lens; (b) determining an optical thickness of the lens at a predetermined number of points having predetermined two-dimensional coordinates on the surface of the lens; and (c) determining lens characteristics from the two-dimensional coordinates, the optical thicknesses at the coordinates, and the index of refraction.

BRIEF DESCRIPTION OF THE DRAWINGS

A complete understanding of the present invention may be gained by considering the following detailed description together with the accompanying drawings, in which.

Corresponding elements in each of the drawings have the same reference numbers.

DETAILED DESCRIPTION

Figure 1:
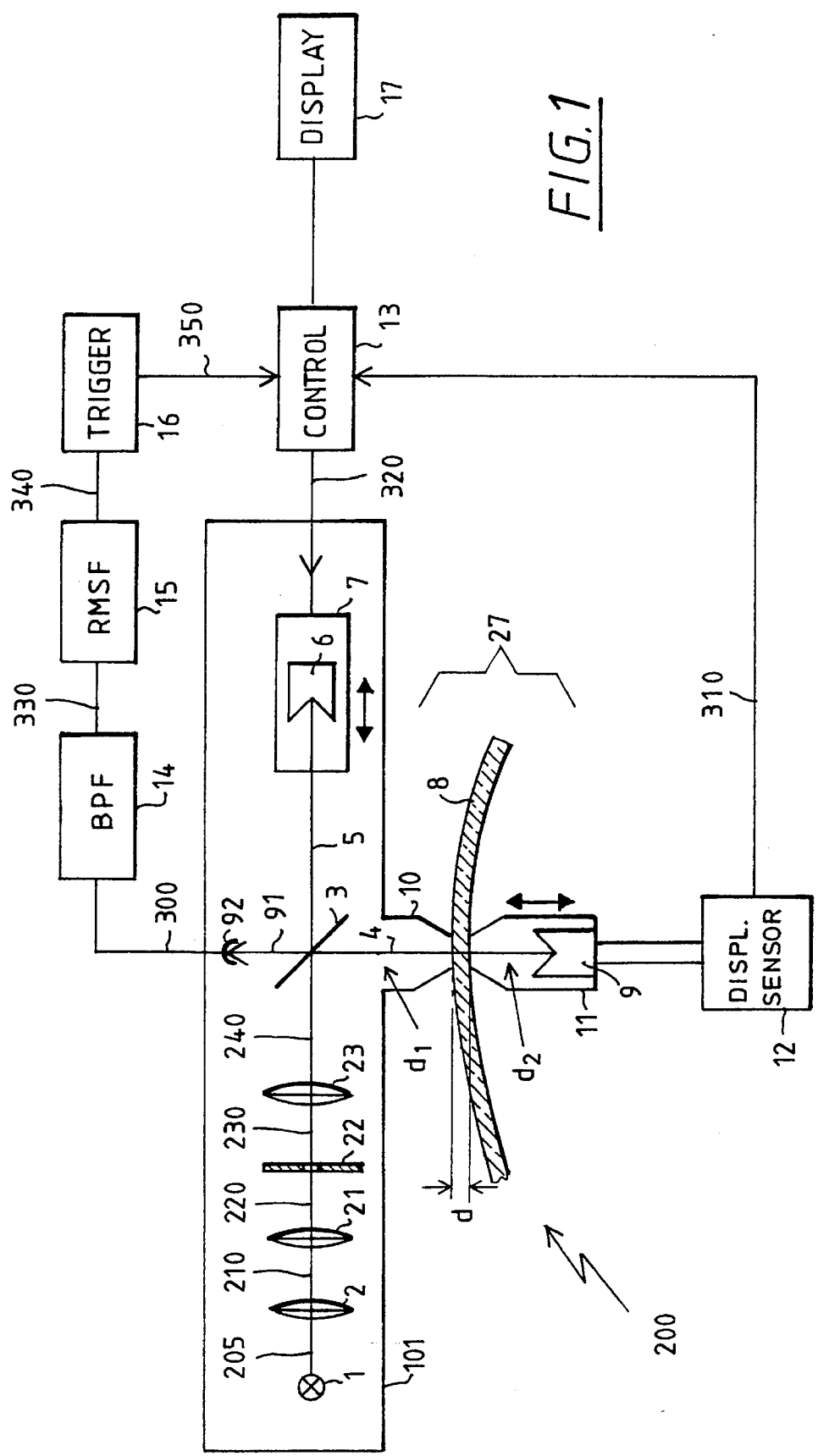
FIG. 1 shows, in pictorial form, a preferred embodiment of a first aspect of the present invention which is apparatus for measuring the index of refraction of glass such as the glass of spectacle lenses without measuring the curvature of the surface of the glass.

FIG. 1 shows, in pictorial form, embodiment 200 of a first aspect of the present invention which is apparatus for measuring the index of refraction of glass such as the glass of spectacle lens 8 without measuring the curvature of the surface of the glass.

In the embodiment of the present invention shown in FIG. 1, a beam of light 205 output by light source 1 is collimated as beam 210 by collimator lens 2. In accordance with the present invention, output 205 from light source 1 has a short temporal coherence length, which coherence length is preferably on the order of a few microns. A suitable light source may be, for example, a light emitting diode ("LED").

Collimated output 210 from lens 2 is focused by lens 21 having focal length f as beam 220 onto small pinhole 22 having a diameter substantially given by the following formula:

$$d = 1.22 \lambda f / a \tag{1}$$

where $\lambda$ is the wavelength of the output from LED 1 and a is the radius of collimated beam 210 formed by lens 2. The result is that beam 230 output from pinhole 22 is spatially coherent. In other embodiments, beam 230 may be provided as the output from a superluminescent light source such as a superluminescent diode. Although a superluminescent diode is a diffraction limited source, it requires more critical alignment than does the extended LED source arrangement shown in FIG. 1.

Beam 230 is again collimated, this time by collimator lens 23, into beam 240. Beam 240 impinges upon beamsplitter 3 to form sample beam 4 and reference beam 5.

As shown in FIG. 1, reference beam 5 is directed to impinge upon reference mirror 6 which is mounted on movable stage 7. Reference mirror 6 can be, for example, a retroreflector such as a retroreflecting prism.

As further shown in FIG. 1, sample beam 4 is directed to impinge upon spectacle lens 8 at its vertex point. Sample beam 4 passes through spectacle lens 8 and impinges upon retroreflecting prism 9 which is mounted on a movable arm of caliper 27. Retroreflected sample beam 4 and retroreflected reference beam 5 are superimposed in detector path 91 and the combined signal is detected by light detector 92.

In accordance with the present invention, reference mirror 6 is moved back and forth by movable stage 7 at a constant linear speed v. In accordance with the present invention, as soon as the optical length of reference beam 5 is equal to the optical length L of sample beam 4, the signal at detector 92 is modulated with a frequency f which is given by the following:

$$f = 2v / \lambda \tag{2}$$

where $\lambda$ is the wavelength of source 1.

Figure 2:
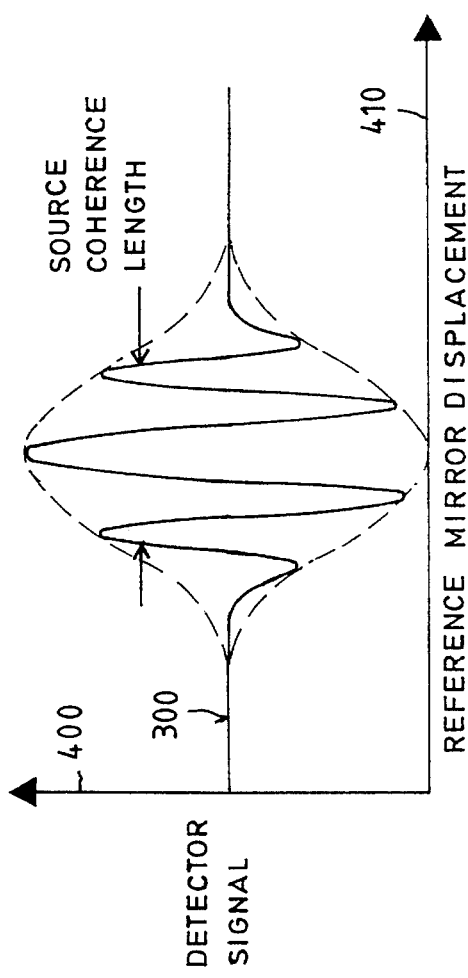
FIG. 2 shows, in graphical form, a signal produced by a detector in accordance with the present invention.

FIG. 2 shows, in graphical form, detector signal 300 produced by detector 92. In FIG. 2, vertical axis 400 represents the amplitude of detector signal 300 and horizontal axis 410 represents the displacement of reference mirror 7. As shown in FIG. 2, the signal length is about equal to the coherence length of light source 1 and, in an embodiment where light source 1 is an LED, the signal length is on the order of microns.

The optical length L of sample beam 4 is given by:

$$L = 2(d_1 + nd + d_2) \tag{3}$$

where $d_1$ is the distance from the upper surface of spectacle lens 8 to beamsplitter 3, n is the index of refraction of the glass material of spectacle 8, d is the thickness of spectacle lens 8, and $d_2$ is the distance from the lower surface of spectacle lens 8 to retroreflector 9. In accordance with the present invention, n, the index of refraction of spectacle lens 8, is determined by solving eqn. (3) for n; this is done in accordance with the embodiment as described below.

Part of the setup steps in carrying out the inventive method entails measuring thickness d of spectacle lens 8. Caliper 27 having pins 10 and 11 is utilized for this purpose. As shown in FIG. 1, retroreflector 9 is fixed to movable pin 11 of caliper 27 and pin 10 of caliper 27 is fixed to interferometer platform 101. The use of a fixed distance between pin 11 and retroreflector 9 and a fixed distance between pin 10 and interferometer platform 101 provides $d_1$ and $d_2$ of eqn. 3 as known, predetermined values. Then, in accordance with the present invention, the thickness d of spectacle lens 8 is measured by displacement sensor 12. Displacement sensor 12 measures the displacement of pin 11 of caliper 27 which holds retroreflector 9.

Electrical readout signal 310 from displacement sensor 12 is transmitted to control unit 13 which outputs signal 320 to drive stepper motor 7. In accordance with the present invention, signal 300 from detector 92 is bandpass filtered by bandpass filter 14. Output signal 330 from bandpass filter 14 is an oscillating signal pulse with a frequency given by eqn. (2) and a pulse length which corresponds to the coherence length of light source 1. Output 330 from bandpass filter 14 is further filtered by root mean square filter 15 to obtain the envelope of the signal pulse produced by detector 92, i.e., signal 340.

Next, output signal 340 from root mean filter 15 is applied as input to trigger unit 16, for example, a Schmitt trigger, to derive timing signal 350 from signal pulse 340. Timing pulse 350 is applied as input to control unit 13.

In accordance with the present invention, in response to timing signal 350 from trigger 16, control unit 13 stores the position of stepper motor 7 at the moment of trigger pulse 350. The position of stepper motor 7 corresponds to the reference arm length which is equal to the optical path length of sample beam 4. This optical length is equal to L of eqn. 3 above.

At this point, control unit 13 has the values needed to solve eqn. 3 for the index of refraction n: (a) $d_1$ and $d_2$ (as discussed above, $d_1$ and $d_2$ are obtained as predetermined values); (b) d (as discussed above, d is obtained from signal 310 output by displacement sensor 12); and (c) L (as discussed above, L is obtained from the position of stepper motor 7). Control unit 13 solves eqn. 3 for n, the index of refraction of the material of spectacle lens 8, and displays the value, for example, on display 17. Many methods and apparatus should be well known to those of ordinary skill in the art for providing control unit 13. For example, control unit 13 may be fabricated utilizing readily available microprocessor apparatus.

Figure 3:
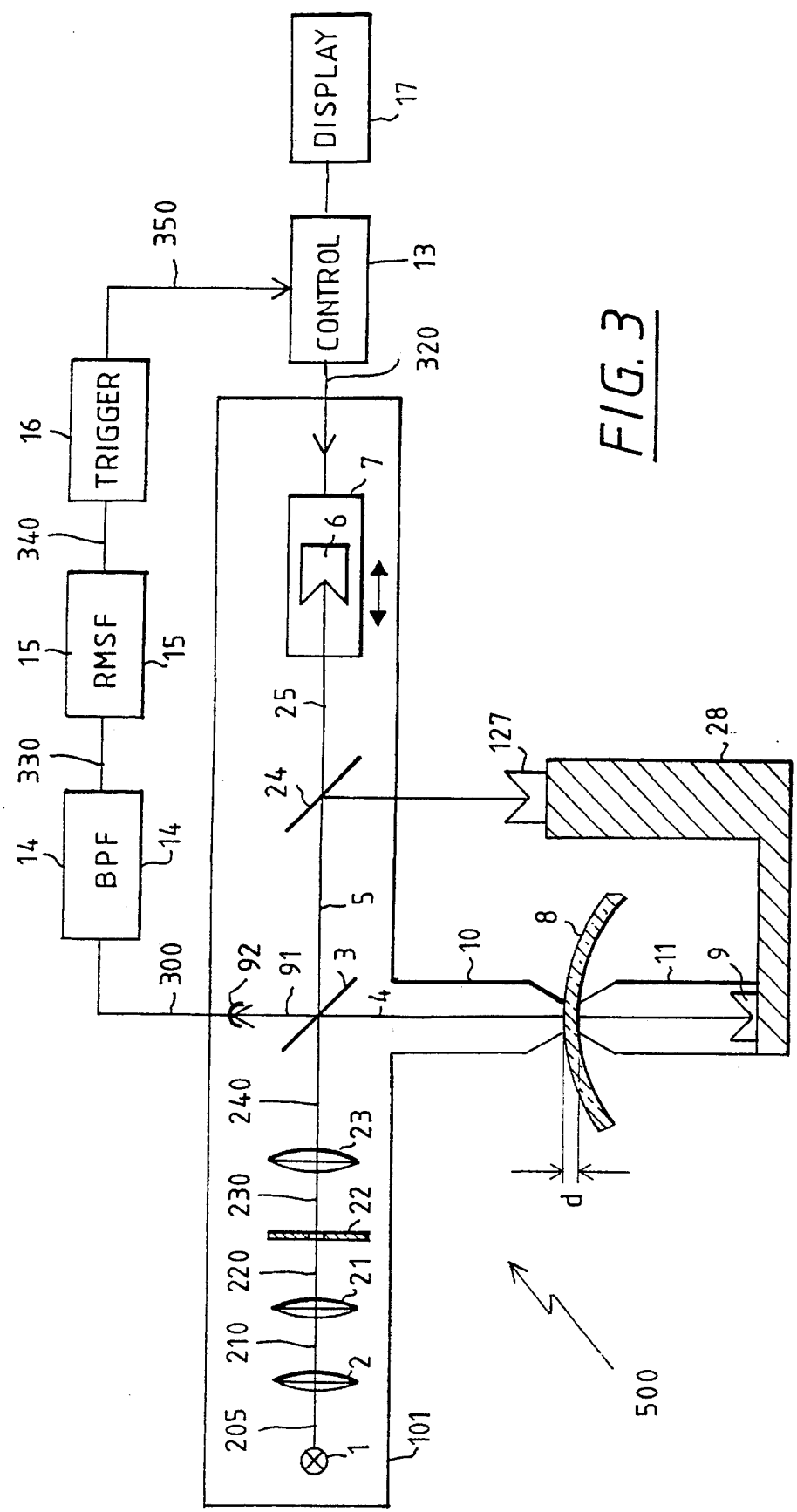
FIG. 3 shows, in pictorial form, an alternate embodiment of the first aspect of the present invention.

FIG. 3 shows, in pictorial form, alternate embodiment 500 of a first aspect of the present invention which is apparatus for measuring the index of refraction of glass such as the glass of spectacle lens 8 without measuring the curvature of the surface of the glass.

The following will concentrate on the matters which are different from embodiment 200 shown in FIG. 1 and described above. As shown in FIG. 3, beam 240 is a spatially coherent, collimated beam which is divided by beamsplitter 3 into sample beam 4 and reference beam 5. As further shown in FIG. 3, reference beam 5 is further split by beamsplitter 24 into a first reference beam 25 and a second reference beam 26. First reference beam 25 is reflected by reference retroreflector 6 which is mounted on stepper motor driven, movable stage 7.

Second reference beam 26 is reflected by retroreflector 127 which is mounted on platform 28. As shown in FIG. 3, retroreflector 9 and caliper pin 11 are also mounted on platform 28. Backreflected, second reference beam 26 is reflected by beamsplitter 24 and beamsplitter 3 and, finally, is superposed with backreflected, first reference beam 25 and backreflected, sample beam 4 in detector beam path 91.

The inventive measurement process takes place as follows. Spectacle lens 8 is brought between caliper pins 10 and 11 so that they are in close contact with spectacle lens 8. The geometrical path between beamsplitter 3, beamsplitter 24 and retroreflector 127 is chosen to be the same as the geometrical path between beamsplitter 3 and retroreflector 9 without spectacle lens 8. As described above, retroreflector 6 is moved back and forth by movable stage 7 at a constant liner speed v and detector 92 produces detector signal 600 shown in FIG. 4.

Figure 4:
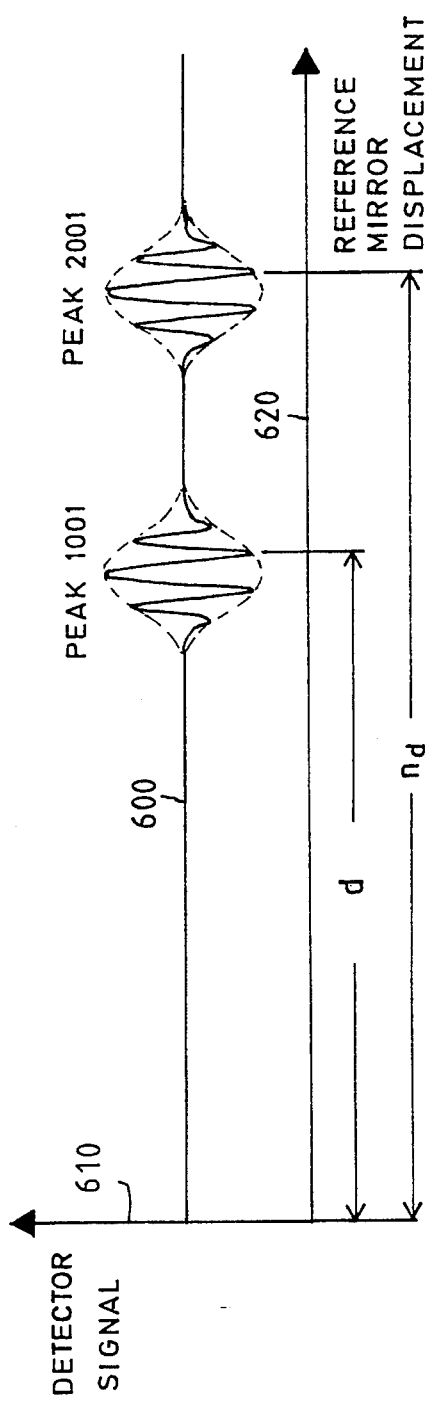
FIG. 4, shows, in graphical form, a signal produced by a detector in accordance with the alternative embodiment of the first aspect of the present invention.

In FIG. 4, vertical axis 610 represents the amplitude of detector signal 600 and horizontal axis 620 represents the displacement of reference mirror 6. The position of signal peak 1001 in FIG. 4 marks the position of retroreflector 127 relative to a zero point of caliper 27, i.e., the zero point of caliper 27 corresponds to a point where caliper pins 10 and 11 in FIG. 3 are in contact (no spectacle 8). As a result, the position of peak 1001 in FIG. 4 measures the thickness d of spectacle lens 8. The position of signal peak 2001 in FIG. 4 depends on the optical thickness nd of spectacle lens 8. Peaks 1001 and 2001 are determined by control unit 13 from signal 350 output from trigger 16 as described above in connection with FIG. 1. Then, control unit 13 uses peaks 1001 and 2001 to obtain the position of retroreflector 6 and, thereby, d and nd. Using these two numbers, d and nd, control unit 13 solves for n and displays the result on display 17. Alternative embodiment 500 shown in FIG. 3 is advantageous in that there is no need for displacement sensor 12 shown in FIG. 1 and there is no need to know $d_1$ (the distance from the upper surface of spectacle lens 8 to beamsplitter 3) or $d_2$ (the distance from the lower surface of spectacle lens 8 to retroreflector 9).

In alternative embodiment 500 of FIG. 3, signal 300 from detector 92 is bandpass filtered by bandpass filter 14. Output signal 330 from bandpass filter 14 is two oscillating signal pulses, each with a frequency given by eqn. (2) and a pulse length which corresponds to the coherence length of light source 1. Output 330 from bandpass filter 14 is further filtered by root mean square filter 15 to obtain the envelope of the signal pulse produced by detector 92, i.e., signal 340.

Next, output signal 340 from root mean filter 15 is applied as input to trigger unit 16, for example, a Schmitt trigger, to derive timing signal 350 from signal pulse 340. Timing pulse 350 is applied as input to control unit 13.

In accordance with the present invention, in response to timing signal 350 from trigger 16, control unit 13 stores the position of stepper motor 7 at the moment of each of the pulses in timing pulse 350. As set forth above, the position of stepper motor 7 corresponding to peak 1001 produces d and the position of stepper motor 7 corresponding to peak 2001 produces nd.

Figure 5:
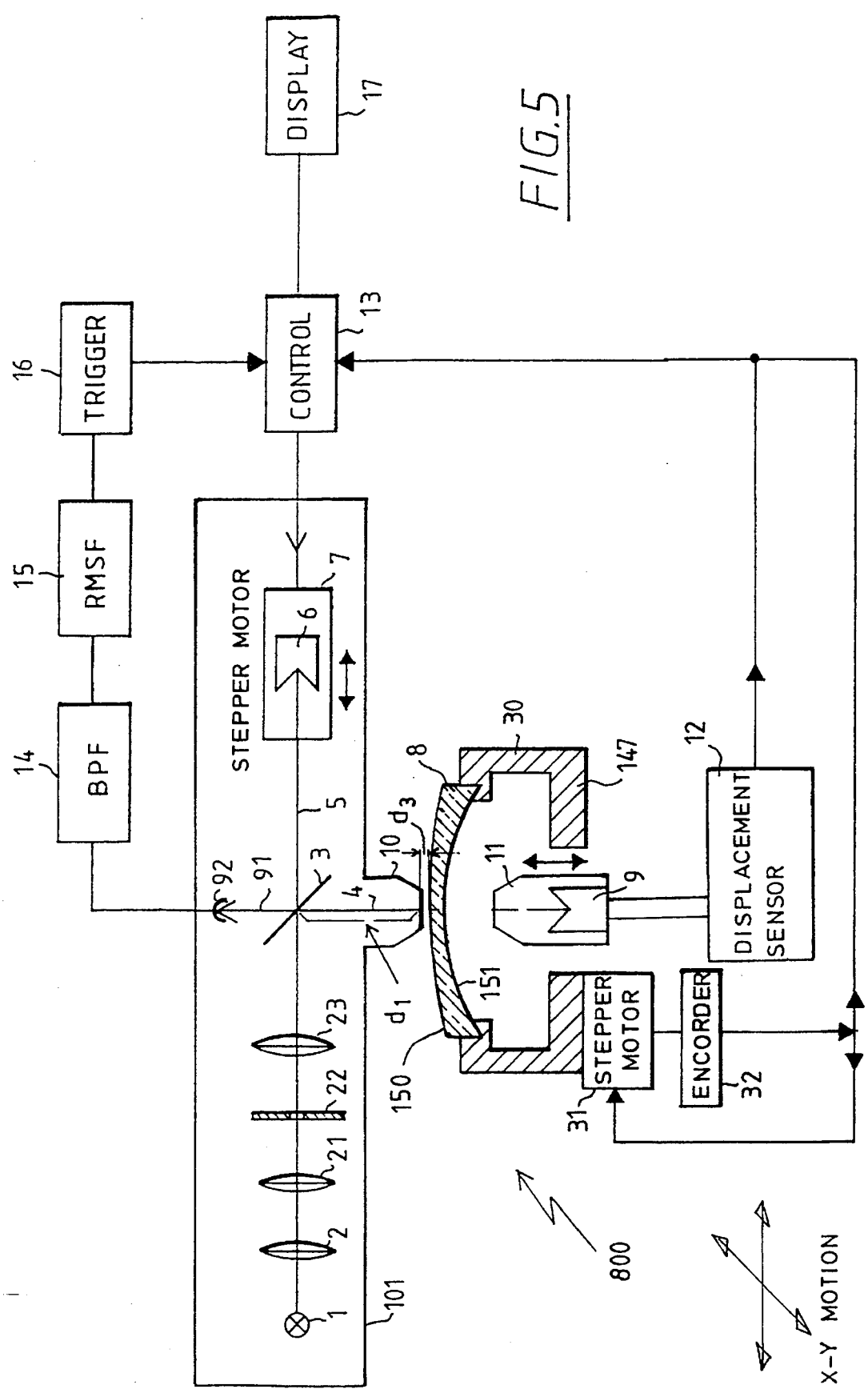
FIG. 5 shows, in pictorial form, an embodiment of a second aspect of the present invention which is apparatus for measuring the following lens characteristics: (a) curvature of the front and back surfaces of the lens; (b) physical thickness; and (c) index of refraction of the lens to determine the front vertex power, back vertex power; and the lens material.

FIG. 5 shows, in pictorial form, embodiment 800 of a second aspect of the present invention which is apparatus for measuring the following lens characteristics: (a) curvature of the front and back surfaces of the lens; (b) physical thickness; and (c) index of refraction of the lens to determine the front vertex power, back vertex power; and the lens material. The following will concentrate on the matters which are different from embodiment 200 shown in FIG. 1 and described above. Embodiment 800 shown in FIG. 5 is similar to embodiment 200 shown in FIG. 1 except that lens 8 is held in testing lens holder 30. Testing lens holder 30 is mounted on two-dimensional translation stage 147, which translation stage 147 is driven by stepper motor 31. Stepper motor 31 is driven in two-dimensions (x-y dimensions shown in FIG. 5) in response to signals sent from control unit 13. Further, encoder 32 receives information from stepper motor 31 which it sends to control unit 13 to enable control unit 13 to determine the position of translation stage 147. In accordance with the second aspect of the present invention, control unit 13 sends a signal to stepper motor 31. In response to the signal, stepper motor 31 moves so that sample beam 4 passes through lens 8 at a predetermined location, preferably a location which is substantially near a central part of lens 8. Next, lens holder 30 is raised so that front surface 150 of lens 8 touches caliper pin 10 and caliper pin 11 is raised so that back surface 151 of lens 8 touches caliper pin 11. Next, a measurement of the index of refraction of lens 8 is made in the manner described above with respect to embodiment 200 shown in FIG. 1 (control unit 13 receives confirmation of the movement of stepper motor 31 from encoder 32). Next, both lens holder 30 and caliper pin 11 are lowered to a predetermined location. The predetermined location is chosen such that translational stage 147 can move freely to pass sample beam 4 through lens 8 at any x-y location. Next, motor 31 is caused to move so that sample beam 4 passes through lens 8 at a predetermined point in a predetermined grid of points (control unit 13 receives confirmation of the movement of stepper motor 31 from encoder 32) to start the lens characteristics measurement. Unlike the index measurement described above, the length of travel of sample beam 4 is now measured from beamsplitter 3 to the surfaces of lens 8, i.e., front surface 150 and back surface 151.

The optical length L of sample beam 4 is given by:

| | | |
|---|---|---|
| $L_f = 2(d_1 + d_3)$ | for the front surface of lens 8 | (4) |
| $L_b = 2(d_1 + nd + d_3)$ | for the back surface of lens 8 | (5) | where: (a) $d_1$ is the predetermined distance from beamsplitter 3 to the tip of caliper pin 10; (b) d is the thickness of lens 8 at the particular point in the grid; and (c) $d_3$ is the distance from the tip of caliper pin 10 to front surface 150 of lens 8 at the particular point in the grid. The optical length L of reference beam 5 is obtained from the position of stepper motor 7. As described above, stepper motor 7 is moved back and forth at a substantially constant speed v. Whenever the condition of eqn. (4) or (5) is satisfied (i.e., the optical length of reference beam 5 is equal to the optical length $L_f$ of sample beam 4 for eqn. (4) and $L_b$ of sample beam 4 for eqn. (5)), control unit 13 will receive a signal and record the position of stepper motor 7 to determine $L_f$ and $L_b$ in the same manner as was done in the measurement of the index of refraction. Thus, for each (x,y) point in the predetermined grid of points, two z positions are recorded. The z position for front surface 150 is directly determined from $L_f$, for example, by dividing by 2. The z position for back surface 151 is determined by subtracting $L_f$ from $L_b$ and solving for d since n, the index of refraction, has been measured. Then, the z position for back surface 151 is determined by, for example, $z_{ib}=(L_f+2d)/2$. As a result, one coordinate, $(x_{if}, y_{if}, z_{if})$, is recorded for front surface 150 of lens 8 and another coordinate, $(x_{ib}, y_{ib}, z_{ib})$, is recorded for back surface 151 of lens 8. Next, lens holder 30 moves to the (i+1)th point in the grid and the measurement is repeated. After all (x,y,z) coordinates have been measured, control unit 13, using curve fitting methods which are well known in the art, determines the curvature of front surface 150 and back surface 151 of lens 8. Next, control unit 13, using methods which are well known in the art, determines lens characteristics of lens 8 such as, for example, sphere, cylinder, prism power of lens 8, and front and back vertex power of lens 8.

We use the following notation in obtaining lens characteristics: n=index of refraction; t=the physical thickness of the center of the lens; $R_f$=radius of the front surface of the lens, $R_b$=radius of the back surface of the lens; $F_f$=front surface power, $F_b$=back surface power, $F_{fv}$=front vertex power; $F_{bv}$=back vertex power; $F_{eq}$=equivalent power (=sphere power), and $F_{cyl}$=cylinder power.

$$F_f = (n-1)/R_f \qquad (6)$$

$$F_b = -(n-1)/R_b \qquad (7)$$

$$F_{fv} = F_b/[1-t/(nF_b)] + F_f \qquad (8)$$

$$F_{bv} = F_f/[1-t/(nF_f)] + F_b \qquad (9)$$

$$F_{eq} = F_f + F_b - t/(nF_fF_b) \qquad (10)$$

$$F_{cyl} = F_{eq}(\max) - F_{eq}(\min) \qquad (11)$$

Finally, using a library look-up table, control unit 13 can determine the lens material by comparing the measured index of refraction with those stored in the library. These results are then provided on display 17.

Although the second aspect of the present invention has been described with respect to an embodiment that utilized the essential portion of embodiment 200 shown in FIG. 1, further embodiments of the second aspect of the present invention can also be fabricated utilizing the essential portion of embodiment 500 shown in FIG. 3 in a similar manner.

It is to be appreciated and understood that the specific embodiments of the invention described hereinbefore are merely illustrative of the general principles of the invention. Various modifications may be made by those skilled in the art consistent with the principles set forth hereinbefore.

What is claimed is:

1. Apparatus for measuring the index of refraction of a material which comprises:

a source of a substantially spatially coherent beam of radiation and having a short temporal coherence length;

means, in response to the beam, for providing a sample beam and a reference beam;

translatable reflecting means, disposed to reflect the reference beam;

holding means for holding the material in the path of the sample beam, said holding means comprising reflecting means for reflecting the sample beam back through the material and means for determining the thickness of the material where the sample beam passes through;

detector means, disposed to detect the reflected reference beam and the reflected sample beam, for producing a detector output signal in response thereto; and analysis means, in response to the detector output signal, for determining a position of the translatable reflecting means and, in response to the position of the translatable reflecting means and the thickness of the material, for determining the index of refraction of the material.

2. The measurement apparatus of claim 1 wherein the source has a temporal coherence length which is less than or equal to several microns.

3. The measurement apparatus of claim 2 wherein the source is an light emitting diode.

4. The measurement apparatus of claim 3 wherein the source further comprises means for collimating output from the LED and means for focusing the collimated output through a pinhole.

5. The measurement apparatus of claim 2 wherein the means for providing a sample and a reference beam is a beamsplitter.

6. The measurement apparatus of claim 2 wherein the translatable reflecting means is a retroreflector mounted on a stepper motor.

7. The measurement apparatus of claim 2 wherein the holder for the material is a caliper means which holds a first surface of the material at a predetermined distance from the beamsplitter and a second surface of the material at a predetermined distance from the reflecting means.

8. The measurement apparatus of claim 7 wherein the reflecting means is a retroreflector and the means for determining the thickness of the material comprises means for determining displacement of the caliper.

9. The measurement means of claim 8 wherein the detector means comprises a detector whose output is bandpass filtered, root means square filtered, and applied to a trigger.

10. The measurement apparatus of claim 6 wherein the retroreflector is moved at a substantially constant speed.

11. Method for measuring the index of refraction of a material comprises the steps of:

forming a substantially spatially coherent beam of radiation having a short temporal coherence length;

splitting the beam into a sample beam and a reference beam;

reflecting the reference beam from a translatable reflector;

holding the material in the path of the sample beam and reflecting the sample beam back through the material;

determining the thickness of the material where the sample beam passes through;

detecting the reflected reference beam and the reflected sample beam and producing a detector output signal in response thereto;

determining a position of the translatable reflector in response to the detector output signal; and determining the index of refraction of the material in response to the position of the translatable reflector and the thickness of the material.

12. Apparatus for measuring the index of refraction of a material which comprises:

a source of a substantially spatially coherent beam of radiation and having a short temporal coherence length;

means, in response to the beam, for providing a sample beam and a first and a second reference beam;

translatable reflecting means, disposed to reflect the first reference beam;

holding means for holding the material in the path of the sample beam, said holding means comprising reflecting means for reflecting the sample beam back through the material and means for reflecting the second reference beam;

detector means, disposed to detect the reflected first reference beam, the reflected second reference beam, and the reflected sample beam, for producing a detector output signal in response thereto; and analysis means, in response to the detector output signal, for determining a first and a second position of the translatable reflecting means and means, in response to the first and second positions, for determining the index of refraction of the material.

13. Method for measuring the index of refraction of a material which comprises the steps of:

forming a substantially spatially coherent beam of radiation having a short temporal coherence length;

splitting the beam into a sample beam and a first and a second reference beam;

reflecting the first reference beam from a translatable reflector;

holding the material in the path of the sample beam and reflecting the sample beam back through the material;

reflecting the second reference beam from a position which is fixed with respect to the position of reflection of the sample beam;

detecting the reflected first reference beam, the reflected second reference beam, and the reflected sample beam and producing a detector output signal in response thereto;

determining a first and a second position of the translatable reflector in response to the detector output signal; and determining the index of refraction of the material in response to the first and second positions.

14. The measurement apparatus of claim 12 wherein the source has a temporal coherence length which is less than or equal to several microns.

15. The measurement apparatus of claim 12 wherein the translatable reflecting means is moved at a substantially constant speed.

16. The measurement apparatus of claim 2 wherein the source is a superluminescent diode.

17. The measurement apparatus of claim 12 wherein the source is a superluminescent diode.

18. Method for measuring lens characteristics which comprises the steps of:

determining the index of refraction of the lens by performing the following steps:
(a) forming a substantially spatially coherent beam of radiation having a short temporal coherence length;
(b) splitting the beam into a sample beam and a reference beam;
(c) reflecting the reference beam from a translatable reflector;
(d) holding the lens in the path of the sample beam and reflecting the sample beam back through the lens;
(e) determining the thickness of the lens where the sample beam passes through the lens;
(f) detecting the reflected reference beam and the reflected sample beam and producing a detector output signal in response thereto;
(g) determining a position of the translatable reflector in response to the detector output signal; and
(h) determining the index of refraction of the lens in response to the position of the translatable reflector and the thickness of the lens;

determining an optical thickness of the lens between a predetermined number of points on a front surface and a back surface of the lens and three-dimensional representations of the predetermined coordinates; and determining lens characteristics from the three-dimensional representations and the index of refraction.

19. The method of claim 18 wherein the step of determining a thickness comprises the steps of:

forming a substantially spatially coherent beam of radiation having a short temporal coherence length;

splitting the beam into a sample beam and a reference beam;

reflecting the reference beam from the translatable reflector;

holding the lens in the path of the sample beam and reflecting the sample beam from the front and back surfaces of the lens;

detecting the reflected reference beam and the reflected sample beams and producing detector output signals in response thereto;

determining positions of the translatable reflector in response to the detector output signals; and determining the thickness lens in response to the positions of the translatable reflector and the index of refraction.

20. Method for measuring lens characteristics which comprises the steps of:

determining the index of refraction of the lens by performing the following steps:
  (a) forming a substantially spatially coherent beam of radiation having a short temporal coherence length;
  (b) splitting the beam into a sample beam and a first and a second reference beam;
  (c) reflecting the first reference beam from a translatable reflector;
  (d) holding the lens in the path of the sample beam and reflecting the sample beam back through the lens;
  (e) reflecting the second reference beam from a position which is fixed with respect to the position of reflection of the sample beam;
  (f) detecting the reflected first reference beam, the reflected second reference beam, and the reflected sample beam and producing a detector output signal in response thereto;
  (g) determining a first and a second position of the translatable reflector in response to the detector output signal; and
  (h) determining the index of refraction of the lens in response to the first and second positions;

determining an optical thickness of the lens at a predetermined number of points on a front surface and a back surface of the lens and three dimensional representations of the predetermined coordinates; and determining lens characteristics from the three-dimensional representations and the index of refraction.

21. The method of claim 20 wherein the step of determining an optical thickness comprises the steps of:

forming a substantially spatially coherent beam of radiation having a short temporal coherence length;

splitting the beam into a sample beam and a reference beam;

reflecting the reference beam from the translatable reflector;

holding the lens in the path of the sample beam and reflecting the sample beam from the front and back surfaces of the lens;

detecting the reflected reference beam and the reflected sample beams and producing detector output signals in response thereto;

determining positions of the translatable reflector in response to the detector output signals; and determining the thickness of the lens in response to the positions of the translatable reflector and the index of refraction.

22. Apparatus for measuring lens characteristics which comprises:

a source of a substantially spatially coherent beam of radiation and having a short temporal coherence length;

means, in response to the beam, for providing a sample beam and a reference beam;

translatable reflecting means, disposed to reflect the reference beam;

translatable holding means for holding the material in the path of the sample beam, said holding means comprising reflecting means for reflecting the sample beam back through the material and means for determining the thickness of the material where the sample beam passes through;

detector means, disposed to detect the reflected reference beam and the reflected sample beam, for producing a detector output signal in response thereto; and analysis means which comprises:
  (a) index means, in response to the detector output signal, for determining a position of the translatable reflecting means and, in response to the position of the translatable reflecting means and the thickness of the material, for determining the index of refraction of the material;
  (b) coordinate means for generating a signal to cause the translatable holding means to hold the lens so that the sample beam is reflected from a front and back surface of the lens at a predetermined number of grid locations;
  (c) thickness means, in response to the detector output signal, for determining front and back reflection positions of the translatable reflecting means for the predetermined grid locations and, in response to the front and back reflection positions of the translatable reflecting means, the index of refraction, and the predetermined grid locations, for determining the thickness of the lens at the predetermined grid locations and three-dimensional representations of the predetermined grid locations; and lens characteristic means for determining lens characteristics from the three-dimensional representations and the index of refraction.

23. The method of claim 18 wherein the step of determining lens characteristics comprises determining the radius of curvature of a front lens surface.

24. The method of claim 23 wherein the step of determining lens characteristics further comprises determining the radius of curvature of a back lens surface.

25. The method of claim 24 wherein the step of determining lens characteristics further comprises determining one or more of the following: a from surface power, a back surface power, a from vertex power, a back vertex power, an equivalent power and a cylinder power.

26. The method of claim 20 wherein the step of determining lens characteristics comprises determining the radius of curvature of a front lens surface.

27. The method of claim 26 wherein the step of determining lens characteristics further comprises determining the radius of curvature of a back lens surface.

28. The method of claim 27 wherein the step of determining lens characteristics further comprises determining one or more of the following a front surface power, a back surface power, a front vertex power, a back vertex power, an equivalent power and a cylinder power.

* * * * *